United States Patent  
Yannam et al.

(10) Patent No.: US 12,406,141 B2
(45) Date of Patent: Sep. 2, 2025

(54) SELECTION SYSTEM FOR CONTEXTUAL PREDICTION PROCESSING VERSUS CLASSICAL PREDICTION PROCESSING

(71) Applicant: Bank of America Corporation, Charlotte, NC (US)

(72) Inventors: Ramakrishna R. Yannam, The Colony, TX (US); Emad Noorizadeh, Plano, TX (US); Rajan Jhaveri, Plano, TX (US); Jennifer Russell, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 406 days.

(21) Appl. No.: 17/993,048

(22) Filed: Nov. 23, 2022

(65) Prior Publication Data

US 2024/0169152 A1    May 23, 2024

(51) Int. Cl.
*G06F 40/284* (2020.01)
*G06F 3/01* (2006.01)
*G06F 40/40* (2020.01)

(52) U.S. Cl.
CPC ............ *G06F 40/284* (2020.01); *G06F 3/017* (2013.01); *G06F 40/40* (2020.01)

(58) Field of Classification Search
CPC ............ G06F 40/40; G06F 40/30; G06F 3/17
See application file for complete search history.

(56) References Cited

U.S. PATENT DOCUMENTS

| | | | |
|---|---|---|---|
| 11,201,966 B1* | 12/2021 | Restorff | G06F 40/35 |
| 11,902,470 B1* | 2/2024 | Smith-Mickelson | H04M 3/5235 |
| 11,914,848 B2* | 2/2024 | Blatz | G06F 3/0485 |
| 11,978,437 B1* | 5/2024 | Thattai | G10L 13/027 |
| 2007/0143099 A1* | 6/2007 | Balchandran | G06F 40/40 704/9 |
| 2018/0239837 A1* | 8/2018 | Wang | G06F 16/90335 |
| 2023/0077942 A1* | 3/2023 | Crutchington | G06Q 20/409 705/39 |

* cited by examiner

Primary Examiner — Bhavesh M Mehta
Assistant Examiner — Joseph J. Yamamoto
(74) Attorney, Agent, or Firm — Weiss & Arons LLP

(57) ABSTRACT

Apparatus, methods and systems for contextual prediction processing is provided. Methods may include receiving a conversation from an entity. The conversation may include current utterance, previous utterances and details. Methods may include using an action-topic ontology to build, using data retrieved from the current utterance, a conversation frame that corresponds to the current utterance. Methods may include merging the conversation frame with data, retrieved from the previous utterances and the details, to generate a target conversation frame. Methods may include validating the target conversation frame to prevent looping over historic data in the event that the current utterance fails to add relevant information. Methods may include generating an enhanced contextual utterance based on algorithms and the target conversation frame. The enhanced contextual utterance may be used to understand the current utterance in a context of the conversation. Methods may include returning the enhanced contextual utterance to the entity.

13 Claims, 6 Drawing Sheets

SELECTION SYSTEM FOR CONTEXTUAL PREDICTION PROCESSING VERSUS CLASSICAL PREDICTION PROCESSING

CROSS-REFERENCE TO RELATED APPLICATION

Co-pending U.S. patent application Ser. No. 17/993,013, entitled, "DUAL-PIPELINE UTTERANCE OUTPUT CONSTRUCT", filed on even date herewith is hereby incorporated by reference herein in its entirety.

FIELD OF TECHNOLOGY

Aspects of the disclosure relate to language processing. Specifically, the disclosure relates to contextual language processing—i.e., processing language in view of the context in which it is uttered.

BACKGROUND OF THE DISCLOSURE

Entities have increasingly used Interactive Voice and text Response systems (referred to herein as IVRs) to communicate with humans. Using classical prediction processing, a system would respond to a human inquiry and only consider the most recent user input provided. However, many times, this would frustrate the human, especially when a system would request information that was previously provided by the human during the conversation.

Therefore, it would be desirable to provide a system that leverages contextual information—i.e., information provided during the conversation and not necessarily provided during the most recent user input—to respond to a human inquiry.

For example, if a user utters, or otherwise electronically communicates, "show my transaction from W-mart"—this utterance lacks sufficient information to enable a system to formulate a response. However, if there was a preceding utterance of "$21.64" then it would be desirable if the system can begin to deduce the user intent in the first utterance—i.e., "show my transaction from W-mart" that was valued at $21.64.

However, contextual conversation processing may be more resource-consumptive than classical prediction processing. Therefore, it may be further desirable for the system to select either classical prediction processing or contextual prediction processing based on a plurality of factors. It would be desirable for such a system to select contextual prediction processing when the contextual prediction processing enables the IVR to provide a more accurate response to the human inquirer. It would also be desirable for such a system to select classical prediction processing when contextual prediction processing does not enable the IVR to provide a more accurate response to the human inquirer. As such, accuracy may be increased while extraneous resource-consumption may be avoided.

SUMMARY OF THE DISCLOSURE

A three-tiered selection method for selecting either contextual prediction processing or classical prediction processing for providing a response to a user input may be provided.

Methods may include receiving a user input from an application. The application may be operating on a device. The device may be associated with a user. The application may be a software application. The device may be a mobile device, laptop or any other suitable device.

Methods may include initiating a classical analysis on the user input at a first tier of the selection method. The classical analysis may be initiated at the first tier when the user input is a first user input within a conversation. The classical analysis may be initiated, at the first tier, when the user input includes a gesture entered by the user at the application. The gesture may be a tap, click or selection of, for example, a selectable button, on the application.

Methods may include identifying, at the first tier, using the classical analysis, a classical response to the user input. Methods may include identifying, at the first tier, the classical response as an accurate response to the user input. A classical response may be based on a classical analysis of the user input.

Methods may include initiating, at the second tier, the classical analysis on the user input. Methods may include identifying, at the second tier, using the classical analysis, the classical response to the user input.

Methods may include identifying, at the second tier, a classical confidence value for the classical response to the user input. When the classical confidence value is above a predetermined confidence value, methods may include identifying, at the second tier, the classical response as the accurate response to the user input. The predetermined confidence value may be a percentage, such as 60%, 80% or 95%. The predetermined confidence value may be a score such as 100 or 500.

Methods may include initiating, at a third tier, a contextual analysis on the user input when the classical confidence value is below the predetermined confidence value. The contextual analysis may transform, using two more user inputs included in the conversation, the user input into a contextual user input.

Methods may include identifying, at the third tier, a contextual response to the contextual user input. A contextual response may be based on a contextual analysis of the user input. Methods may include identifying, at the third tier, a contextual confidence value for the contextual response to the contextual user input.

Methods may include comparing, at the third tier, the contextual confidence value to the classical confidence value. Methods may include identifying, at the third tier, the contextual response as the accurate response when the contextual confidence value is greater than the classical confidence value by over a threshold amount. The classical confidence level and/or the threshold amount may be a percentage such as 60% or 95%. The classical confidence level and/or the threshold amount may be a score, such as 100 or 500. Methods may include identifying, at the third tier, the classical response as the accurate response when the classical confidence value is greater than the contextual confidence value by over the threshold amount.

Methods may include presenting the accurate response to the user via the application. It should be noted that if the classical response is the same as the contextual response, methods may present the response (either classical or contextual) prior to identifying the contextual confidence level. The presenting may include displaying the response on a graphical user interface ("GUI") on the application.

In certain embodiments, the contextual confidence value may be within a predetermined value window from the classical confidence value. As such, the system may be unable to select, with a predetermined level of confidence, the contextual response or the classical response. As such, methods may also include identifying, at the third tier, a sentiment analysis score for the contextual response and a sentiment analysis score for the classical response. In such embodiments, the sentiment analysis score may be used as the decider between the contextual response and the classical response.

Methods may include comparing, at the third tier, the sentiment analysis score of the classical response to the sentiment analysis score of the contextual response. A sentiment analysis algorithm, which may determine a sentiment analysis score, may determine the sentiment or emotion of the user during the conversation. Methods may also include identifying, at the third tier, the classical response as the accurate response when the sentiment analysis score for the classical response is greater than the sentiment analysis score for the contextual response. Methods may also include identifying, at the third tier, the contextual response as the accurate response when the sentiment analysis score for the contextual response is greater than the sentiment analysis score for the classical response.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
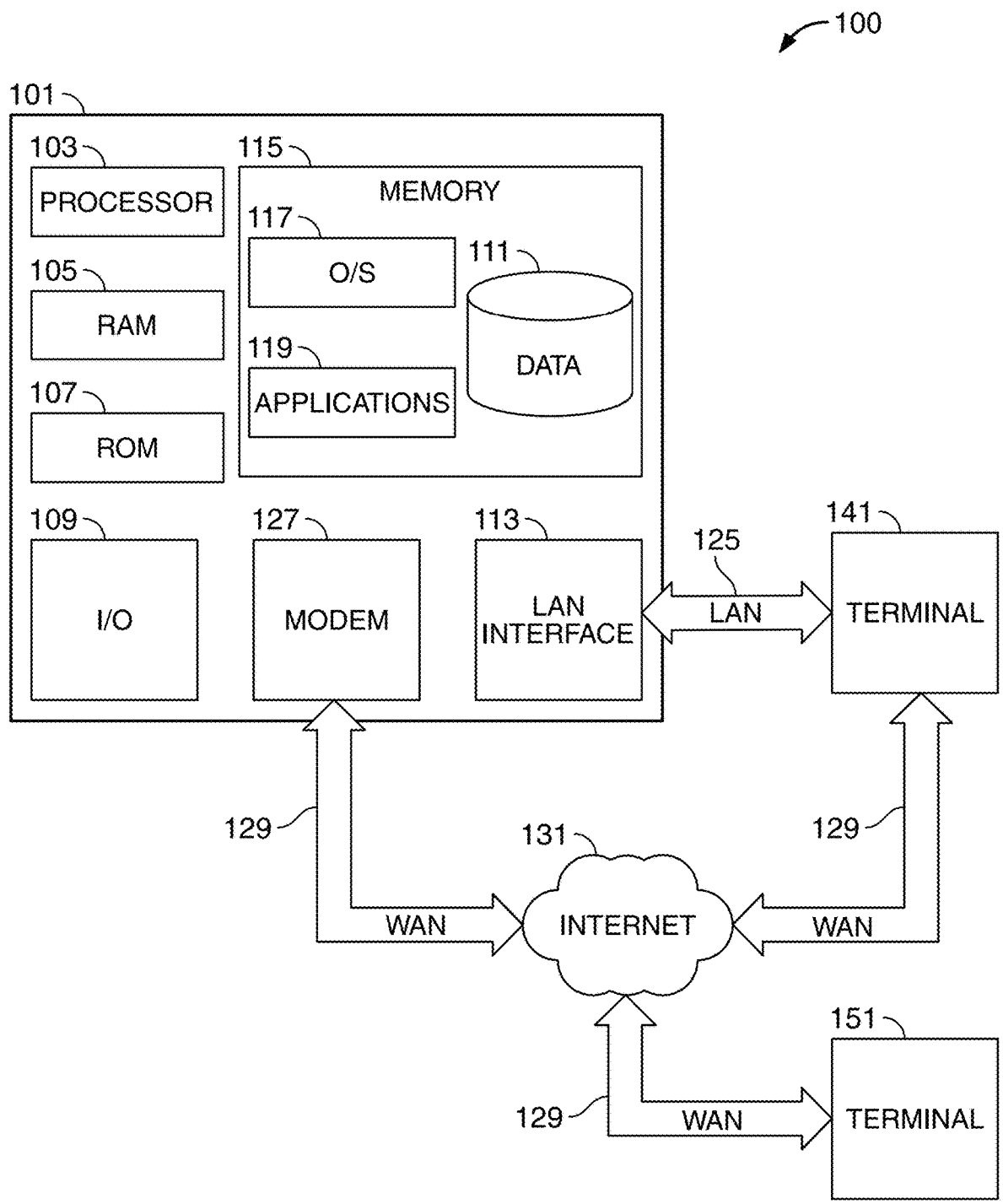
FIG. 1 shows an illustrative diagram for use in accordance with principles of the disclosure.

Apparatus and methods for a selection system for selecting either a contextual prediction processing subsystem or a classical prediction processing subsystem may be provided. The selection system may include three tiers. The selection system may be used in conjunction with an IVR.

IVRs may receive various communications from devices associated with users. These communications may include voice calls, voice messages, short message services ("SMSs"), multimedia message services ("MMSs"), chats, emails or any other suitable communications. The IVR may be associated with an entity, such as a financial entity, business entity or any other suitable entity.

IVRs may receive communications from the devices and respond to inquiries included in the communications. For example, a financial entity IVR may receive a phone call stating "what is my balance on my account?" The IVR may process a response by identifying the device, identifying the user associated with the device and identifying one or more accounts associated with the user. Upon identification of the one or more accounts, the IVR may transmit a responsive communication to the user. The responsive communication may include a list of available accounts. The user may select the correct account. The selection may be executed by selecting a button using a mobile device application, by stating the response on voice call or by any other suitable selection method. The IVR may retrieve the balance information for the selected account. The IVR may present, to the user, either via a mobile device application or via a voice call, the balance information for the selected account.

There may be various methods in which the IVR may identify a response to the user communication. The various methods may include a classical prediction analysis and methods and contextual prediction analysis and methods.

Classical prediction methods may include receiving a current user input. The current user input may be an utterance. Classical prediction methods may also include receiving a plurality of details relating to the current utterance. The plurality of details may include identifying information relating to the user. Such identifying information may include the user's name, date of birth and account information.

Classical prediction methods may also include using an action-topic ontology to build a current conversation frame. The current conversation frame may correspond to the current utterance. The current conversation frame may be built using data retrieved from the current utterance and the plurality of details.

An action-topic ontology may be a language that is interpretable by an entity-specific IVR. In one example, the entity-specific IVR may be a financial entity-specific IVR. As such, the action-topic ontology may be language that is specific to financial entities. The terms action-topic may refer to a set of actions included in the language. Actions may include financial entity verbs, such view or transfer. Topics may include financial entity nouns, such as accounts.

An example of a current conversation frame that included the utterance "Show a transaction on my account in the amount of $21.96" is shown below. It should be noted that the utterance included sufficient information for the system to predict a specific intent. As such, the predicted intent is a specific intent (SERVICE_INTENT_SEARCH_TRANSACTION).

```
{
  "predictedIntentName":
    "SERVICE_INTENT_SEARCH_SUGGESTIONS",
  "cResponseHeader": {
    "correctedQuery": "Show a transaction on my account in the amount of $21.96",
    "message" {
      "originalMessage": "Show a transaction on my account in the amount of $21.96",
      "normalizedMessage": "View a transaction on account number 000-000-0000000 in the amount of $21.96",
      "spellCorrectedMessage": "View a transaction on account number 000-000-0000000 in the amount of $21.96"
    }
  },
```

An example of a current conversation frame that included the utterance "$21.96" is shown below. It should be noted that the utterance "$21.96" does not include sufficient information for the system to predict a specific intent. Therefore, the predicted intent may be a more general intent (SERVICE_INTENT_HELP_SUGGESTIONS). There may be multiple child intents that are included in the general intent. The system may present the child intents to the user for selection.

```
{
    "predictedIntentName":
    "SERVICE_INTENT_HELP_SUGGESTIONS",
    "childIntents": [
        "SERVICE_INTENT_INTERNAL_TRANSFER",
        "SERVICE_INTENT_SEARCH_TRANSACTION",
        "SERVICE_INTENT_TRANSACTION_STATUS",
        "SERVICE_INTENT_TRANSACTION",
        "VIEW_OFFERS"
    ],
    "cResponseHeader": {
        "correctedQuery": "$21.96",
        "message" {
            "originalMessage": "of $21.96",
            "normalizedMessage": "$21.96",
            "spellCorrectedMessage": "$21.96"
    },
```

The current conversation frame may be transmitted to a module that generates a response to the current utterance. The module may be the IVR. The module may be included within the IVR. The module may be a software code element that identifies a response to an utterance.

It should be noted that classical prediction analysis may consider the most recent utterance (also referred to herein as the "current utterance") included in the conversation between the IVR and the user. Classical prediction analysis may not consider previous utterances included in the conversation between the IVR and the user.

Contextual prediction analysis and methods may include receiving a conversation. The conversation may include the current utterance and one or more previous utterances. The conversation may also include a first plurality of details and a second plurality of details. The first plurality of details may relate to the current utterance. The second plurality of details may relate to the one or more previous utterances. Examples of the first plurality of and the second plurality of details may include position of the utterance within the conversation, name of the user, account information associated with the user and any other suitable details.

Contextual prediction methods may also include using an action-topic ontology to build a current conversation frame. The current conversation frame may correspond to the current utterance. The current conversation frame may be built with data retrieved from the current utterance and the first plurality of details.

Contextual prediction methods may include merging the current conversation frame with data retrieved from the one or more previous utterances and/or the second plurality of details, to generate a target conversation frame. The target conversation frame may be structured to prompt a module to generate an answer the current utterance by providing the additional details from the previous utterances. As such, the IVR may not need to request information from the user that was previously received from the user during the conversation.

Contextual prediction methods may include validating the target conversation frame to ensure that the contextual analysis is prevented from looping over historic data in an event that the current utterance fails to add relevant information.

Contextual prediction methods may include generating an enhanced contextual utterance based on a predetermined set of algorithms. The predetermined set of algorithms may be a predetermined set of heuristics. The predetermined set of heuristics may be understood as a predetermined set of calculated guesses. The predetermined set of heuristics may be used to identify the most probable missing components of the conversation. The enhanced contextual utterance may be used to understand the current utterance in the context of the conversation.

The enhanced contextual utterance may be transmitted to a module that generates a response to the contextual utterance. The module may be the IVR. The module may be included within the IVR. The module may be a software code element that identifies a response to an utterance. It should be noted that the module may be the same module that responds to the classical utterance. Specifically, because the enhanced contextual utterance frame may include information from previous utterances, the module need not be apprised of whether the incoming frame and/or the utterance is produced by classical analysis or contextual analysis. Rather, the module may execute on the received frame without any prior knowledge or information.

The three-tiered selection system may be used to select either contextual prediction processing or classical prediction processing for a user input. The user input may be an utterance, text or other suitable user input. The system may include a receiver. The receiver may receive a user input from an application operating on a device associated with the user.

The system may include a selection processor. The selection processor may include a first tier, second tier and third tier. The first tier may be initiated upon receipt of the user input from the receiver. The second tier may be initiated when the user input is a subsequent user input within the conversation. The second tier may also be initiated when the user input includes a voice or text utterance as opposed to a click or selection on an application.

The first tier may determine, for certain user inputs, whether contextual prediction processing is unnecessary. Because contextual prediction processing may utilize more resources than non-contextual prediction processing, it may be desirable to identify whether the user input is a candidate for contextual prediction processing. Specifically, when the user input is a first user input within a conversation, the first user input may not be candidate for contextual prediction processing. Additionally, the user input may not be a candidate for contextual prediction processing when the user input includes a gesture entered by the user at the application. Examples of a gesture may include a tap, a click or a selection. The gesture may be made in response to a stimulus provided by the application.

In an example, a user may transmit the query "what is my account balance." The application may display to the user three available accounts as three selection buttons. The user may click on one of the available accounts. The three available accounts, displayed as buttons for selection, may be the stimulus. The click of the user may be the gesture. It should be noted that there is no need for contextual prediction analysis because the user has informed, by providing a gesture, that the system is in the process of selecting the correct prediction.

The first tier may initiate a classical analysis on the user input. The first tier may identify a classical response to the user input using the classical analysis. The first tier may present the classical response to the user via the application.

The second tier may initiate a classical analysis on the user input. The second tier may identify the classical response to the user input using the classical analysis. The second tier may identify a classical confidence value for the classical response to the user input. In order to conserve resources, the second tier may process the user input using the classical analysis. In an event that the classical analysis identifies, above a predetermined confidence value, that the classical response is an accurate response, the system may skip, or not initiate, contextual analysis. As such, the second tier may present the classical response to the user via the application.

The third tier may be initiated when the second tier identifies that the confidence value is below a predetermined confidence value. The third tier may initiate a contextual analysis on the user input when the classical confidence value is below the predetermined confidence value. The contextual analysis may transform the user input into a contextual user input based on two or more user inputs included in the conversation. As such, the contextual user input may include data from two or more user inputs. The third tier may identify a contextual response to the contextual user input. The third tier may identify a contextual confidence value for the contextual response to the contextual user input.

The third tier may compare the contextual confidence value to the classical confidence value. The third tier may present the contextual response to the user via the application when the contextual confidence value is greater than the classical confidence value by over a threshold amount. The third tier may present the classical response to the user via the application when the classical confidence value is greater than the contextual confidence value by over the threshold amount.

At times, the contextual confidence value is within a predetermined value window from the classical confidence value. As such, the contextual confidence value may not be greater than, or less than, the classical confidence value by over the threshold amount. In such instances, a sentiment analysis may be used to select the contextual response or the classical response. As such, the third tier may identify a sentiment analysis score for the contextual response and a sentiment analysis score for the classical response. The third tier may compare the sentiment analysis score of the classical response to the sentiment analysis score of the contextual response. The third tier may present the classical response to the user via the application when the sentiment analysis score for the classical response is greater than the sentiment analysis score for the contextual response. The third tier may present the contextual response to the user via the application when the sentiment analysis score for the contextual response is greater than the sentiment analysis score for the classical response.

The embodiments set forth herein are directed to establishing various capabilities. Included in these capabilities are using persistent memory to store and manage prior user conversations. Pursuant thereto, the embodiments can refer back to historical content independent of having to ask for the historical content again. In addition, the embodiments are directed to enabling contextual understanding—i.e., the ability to use information from prior conversations to predict user goals and intents. In this context, understanding refers to correct prediction of user goal and intent.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as email, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI).

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
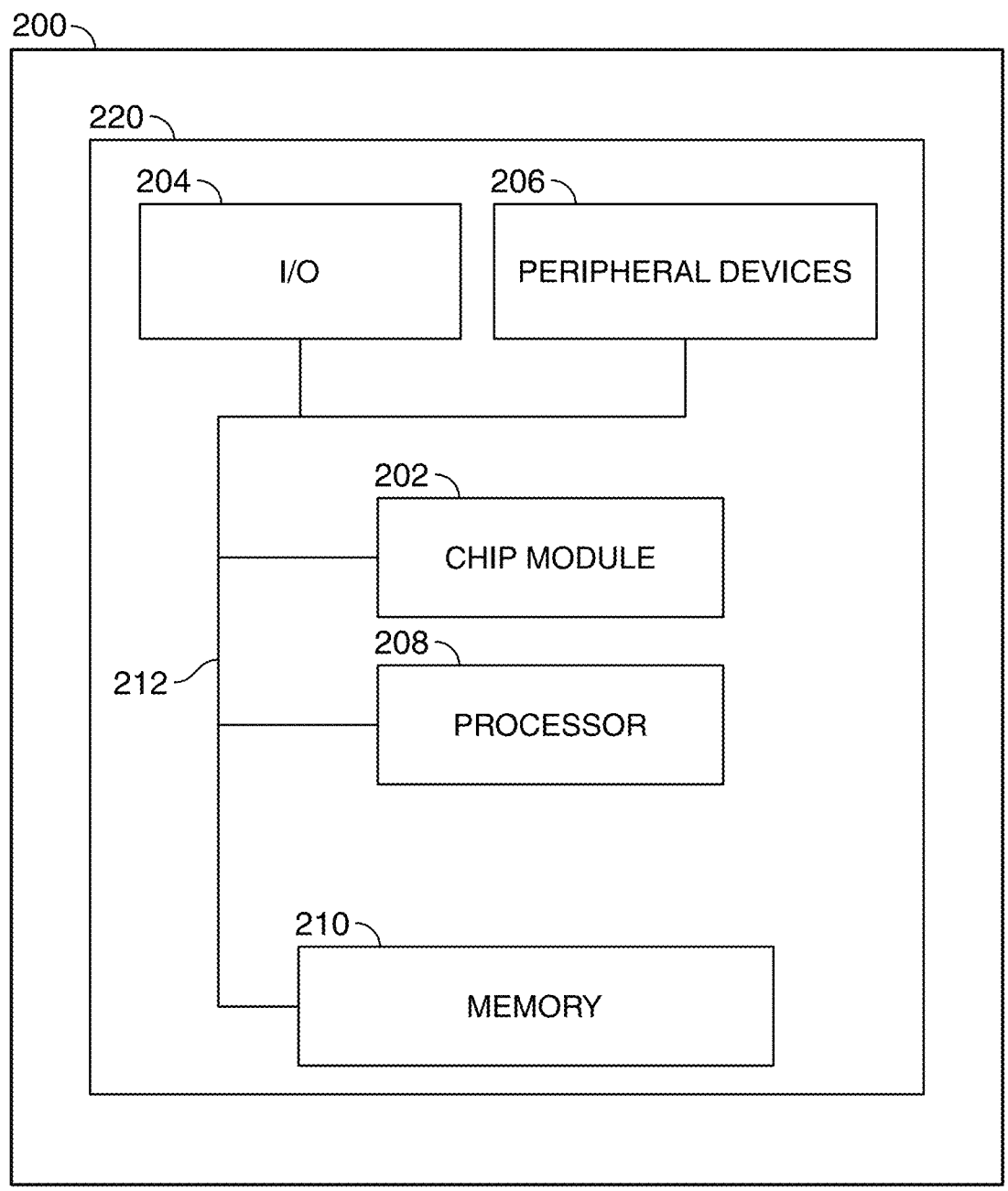
FIG. 2 shows another illustrative diagram for use in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
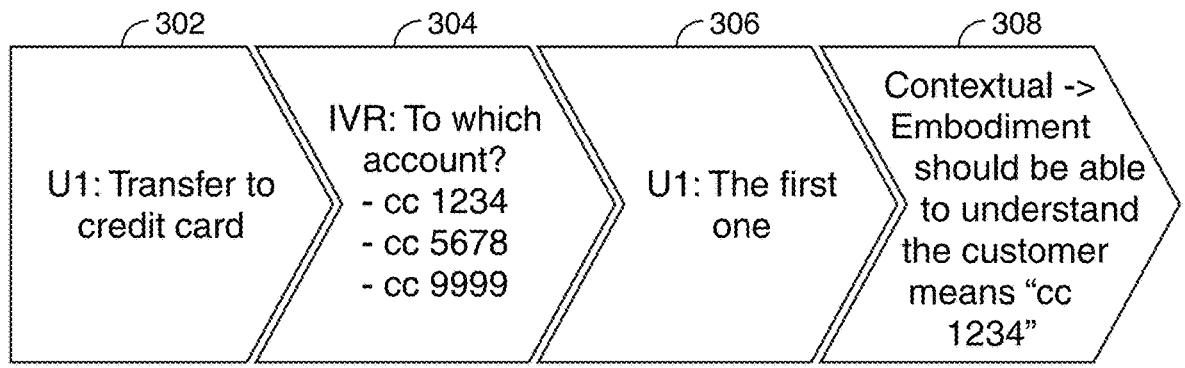
FIG. 3 shows an illustrative flow diagram in accordance with the principles of the disclosure.

FIG. 3 shows an illustrative flow diagram according to the disclosure. At 301, U1 (Utterance 1) shows, at 302, a request to transfer to credit card.

At 304, an IVR prompts or otherwise queries the user to clarify the credit card account to which the user intends the transfer to be directed.

At 306, U2 indicates that the transfer should be directed to "the first one."

At 308, the system indicates that the embodiments should be able to leverage the contextual indications to form an understanding that the customer intends the credit card identified as "cc1234."

The issue with the preceding flow is that context should be able to reveal or otherwise indicate to which credit card U1 referred. Such indication would preferably save multiple steps in the flow—e.g., steps 304 and 306.

Figure 4:
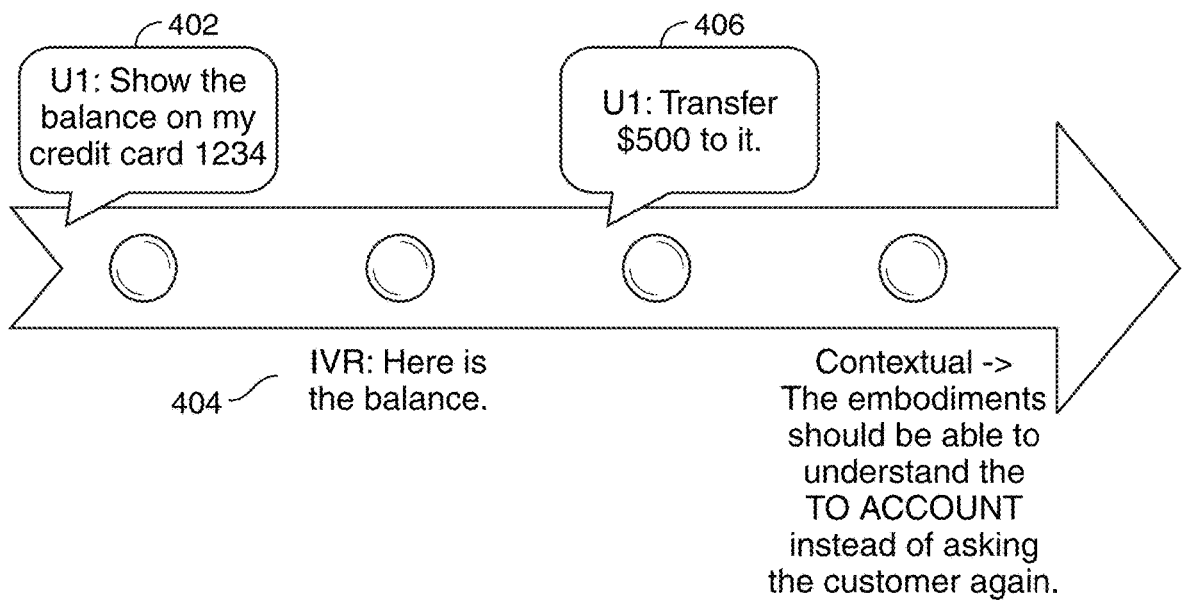
FIG. 4 shows another illustrative flow diagram in accordance with the principles of the disclosure.

FIG. 4 shows another flow diagram according to the disclosure. When a customer or use is explicitly referring to a topic/entity in a previous utterance, a co-reference algorithm according to the disclosure preferably looks to the previous utterance to resolve the co-reference. However, the conventional algorithms typically only look to the IVR response to U1, as is shown in FIG. 4. As such, a co-reference algorithm can be used to again cut resource-consumptive steps from the chain of communication. Furthermore, a co-reference algorithm can reduce errors generated from additional steps in the communication.

At step 402, U1 requests a showing of the balance on credit card 1234. At step 404, IVR responds with credit card balance information. At step 406, U2 requests a "transfer $500 to it." The "it" in U2 is unclear. However, leveraging the contextual information available in the conversation at 402 and 404, the embodiments should be able to identify the "to it" account, instead of having to request from the user for identification of the account.

Thus, an appropriate co-reference algorithm can save resources and reduce errors in the IVR-user conversations or other communications.

Figure 5:
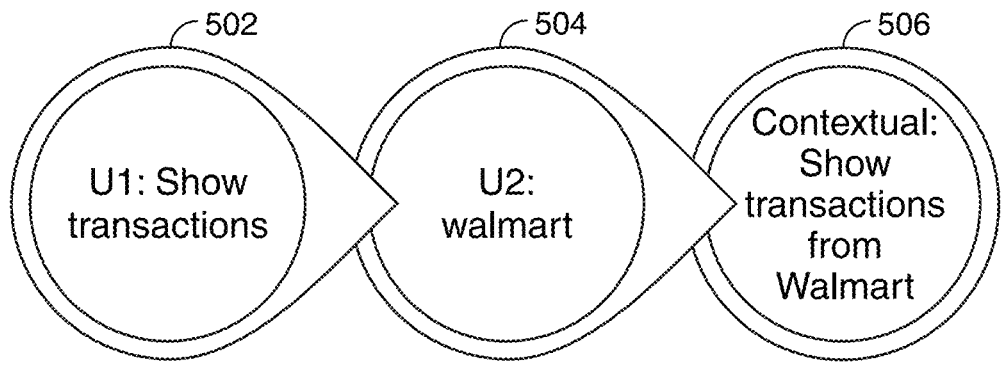
FIG. 5 shows yet another flow diagram that is based on entity resolution in accordance with the principles of the disclosure.

FIG. 5 shows yet another flow diagram that is based on entity resolution relative to the embodiments. Currently, IVR systems, form part of, or otherwise incorporate, a chatbot—i.e., an application used to conduct an on-line chat conversation via text or text-to-speech in lieu of providing direct contact with a live human agent. These IVR systems do not typically or conventionally understand when a customer or other user proactively provides information—e.g., entity information—related to the previous utterance. At 502, U1 requests a showing of transactions. At 504, U2 identifies, as part of the flow of the communication, Walmart as the entity of interest. An appropriate contextual algorithm, the output of which is shown at 506, considers U2 prior to responding to U1 and then responds to U1 with a showing of transactions from Walmart. Such an algorithm may leverage ontological rules as well as other suitable rules to replace/add or otherwise correct entity information in pending or other utterances.

When intent is changed, or a new workflow initiated, embodiments may preferably collect entity information again, or otherwise reset entity information to previous default settings. In addition, embodiments may be configured to review past communications and determine if the entity determinations therein relate to current utterances and communications. This process is referred to herein as memory-based resolution.

Figure 6:
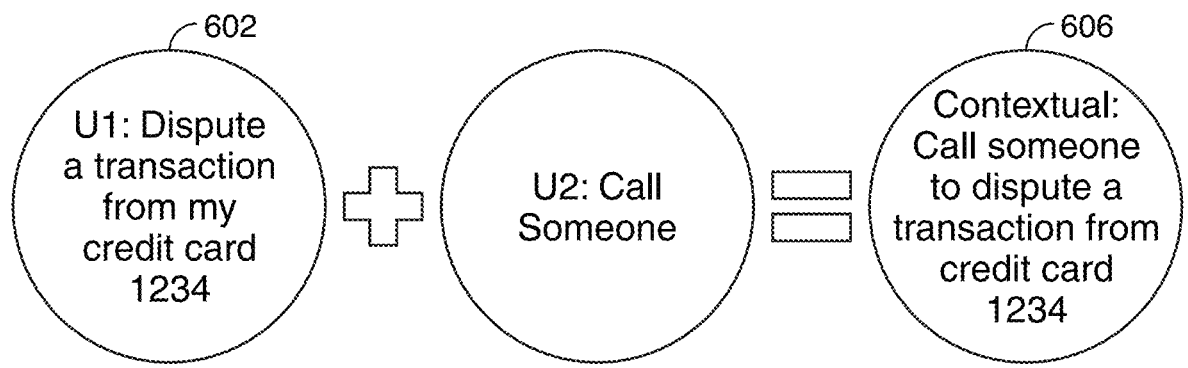
FIG. 6 shows determining an intent associated with a concatenation of utterances in accordance with the principles of the disclosure.

FIG. 6 shows determining an intent associated with a concatenation of utterances. The intent determination leverages an appropriate memory-based resolution schema. Specifically, at 602, U1 articulates a dispute regarding a transaction from credit card 1234. U2 expresses that the user is interested in calling someone. At step 606, a suitable contextual algorithm links U1 and U2 to formulate a cohesive intent—i.e., the user has expressed an intent to call someone to dispute a transaction on credit card 1234.

Not always is intent prediction determined just by the information in previous utterances. Rather, when a later-in-time utterance is reviewed in the context of information from a previous utterance, it may be determined that the intent of the later-in-time utterance is different from the information expressed in the previous utterance. However, the information in the previous utterance may be used to inform the intent with respect to the later-in-time utterance. The informing of the intent of the later-in-time utterance preferably enables the embodiments to correctly determine the intent of the later-in-time utterance.

Figure 7:
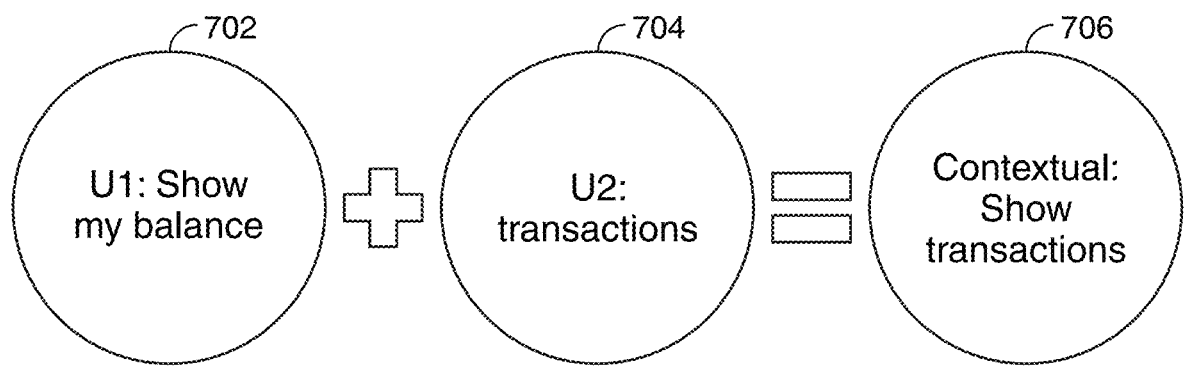
FIG. 7 shows yet another flow diagram that is based on entity resolution in accordance with the principles of the disclosure.

FIG. 7 shows yet another flow diagram. This flow diagram shows intent prediction in the context of a previous utterance. FIG. 7 specifically addresses the embodiments where information from a previous utterance is used to inform the intent of a later-in-time utterance, even though certain information from the previous utterance diverges in intent from information in the later-in-time utterance. At 702, U1 requests the system to show my balance. At 704, U2 indicates that the user is interested in transactions. The embodiments conclude, based on the context of U1 in combination with the information in U2, that the intent of the user in U2, as shown at 706, is the user's expressed desire to show transactions.

Algorithms based on the embodiments, as set forth herein, may operate as follows. In one example, a U1 may articulate, "show my transactions." A U2 may articulate "Walmart." Here we expect Artificial Intelligence (AI) which administers IVR rules (referred to herein as a cortex) to understand that when the user says "Walmart" as the second utterance, the user is trying to look for their transactions from Walmart.

In ontology defined in the cortex, there is a relation between show (action) and transactions (topic) and a relation between transactions (topic) and Walmart (MerchantName entity). Thus, the ontology defined in the cortex reuses the underlying concepts from the existing ontology and normalizes the words to a parent class (show internally is a sub-class of class View).

The foregoing approach to reusing underlying concepts from existing ontology and normalizing words to a parent class obtains two major benefits—first, the cortex does not need to add relations for all synonyms of the parent class View with all different topics. Rather, it just builds a relation between View (action) and Transaction (topic) and the other relations (show subclass of View and transactions subclass of Transaction) are able to help the system understand the relation between show and transactions.

The second benefit is that if the token (phrase) is not found in the ontology, cortex may use the existing ontology to look for the synonyms for the parent classes as understood by existing ontology and synonym sets. For example, even if "see" is not added as a subclass of View, cortex concepts retrieve the OntologyClass for see as View and hence any relations that exists for View in the ontology apply to see as action.

In a different example related to a user requesting a stock price, U1 may request, "show stock price of Apple." U2 may state "Walmart." The cortex may be expected to understand that when the user says "Walmart" as the second utterance, the user is trying to search for the stock price of Walmart. In such an instance, there is a relation between View (show is a subclass of View) and StockPrice (stock price is a subclass of StockPrice.)

Figure 8:
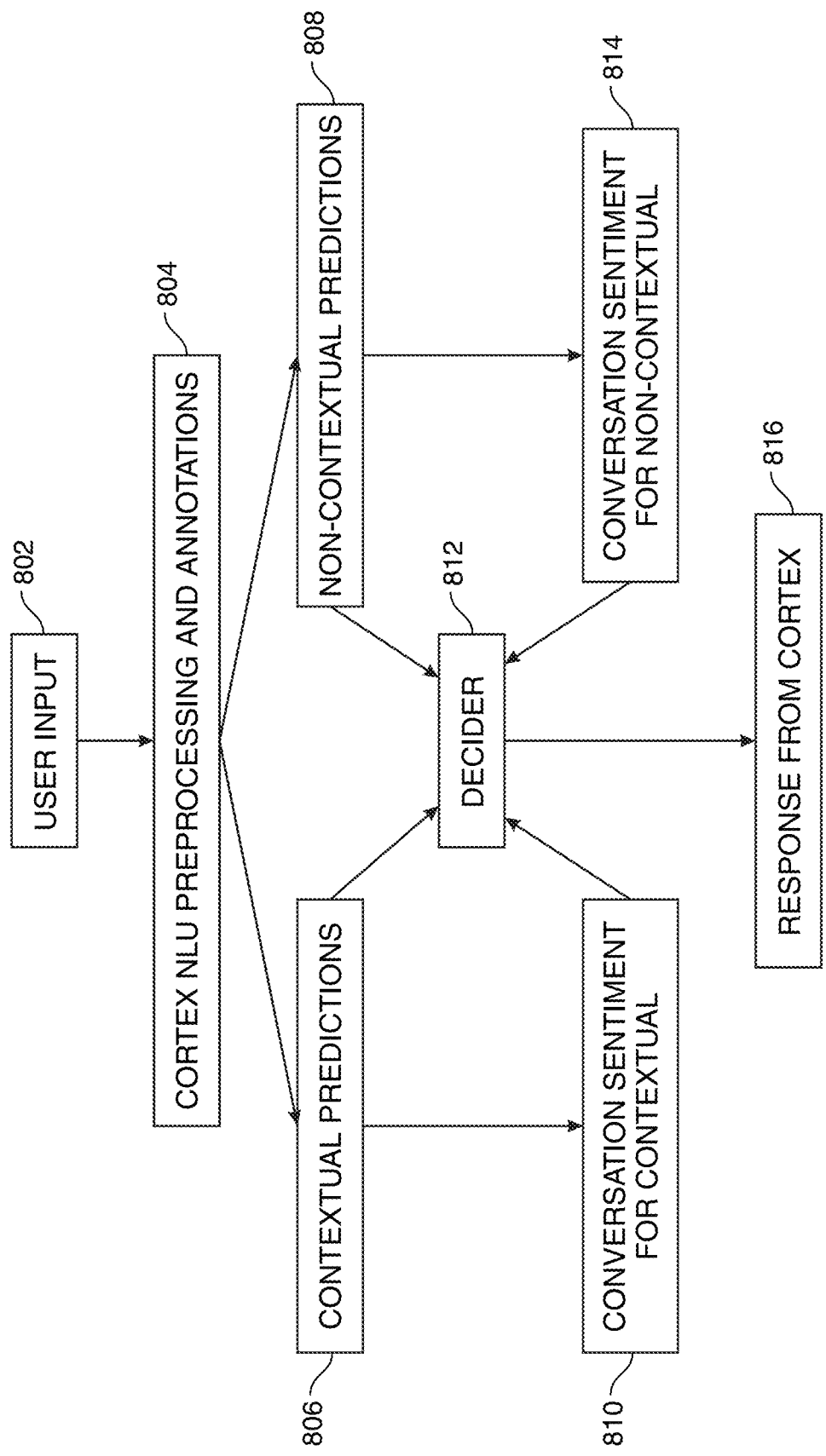
FIG. 8 shows an exemplary architecture in accordance with the principles of the disclosure.

FIG. 8 shows an exemplary architecture according to the embodiments. At 802, a user input, such as an utterance, is received. Thereafter, at 804, the cortex natural language understanding (NLU) is invoked for pre-processing and annotating the utterance. The cortex NLU may correspond to the first tier.

Following pre-processing and annotation, the utterance may be passed through the contextual pipeline 806 to obtain contextual predictions and through the non-contextual pipeline 808 to obtain conventional predictions (non-contextual predictions are also referred to herein as classical predictions). Non-contextual pipeline 808 may correspond to the second tier. The contextual predictions and the non-contextual predictions may be forwarded to a decider, at 812. Contextual pipeline 806, non-contextual 808 and decider 812 may correspond to the third tier. It should be noted that, in some embodiments, the utterance may be transmitted to contextual predictions 806.

Prior to, or in conjunction with, the contextual predictions being sent to decider 812, the contextual predictions may be reviewed and possibly revised in view of conversation sentiment, as shown at 810. Prior to, or in conjunction with, the non-contextual predictions being sent to decider 812, the non-contextual predictions may be reviewed and possibly revised in view of conversation sentiment, as shown at 814. The terms sentiment determinations as used herein are found and described in more detail in co-pending, commonly-assigned, U.S. patent application Ser. No. 17/539,282, filed on Dec. 1, 2021, entitled, "METHODS AND APPARATUS FOR LEVERAGING SENTIMENT VALUES IN FLAGGING AND/OR REMOVAL OF REAL TIME WORKFLOWS", which is hereby incorporated by reference herein in its entirety.

Finally, the decider 812, based on all the inputs to it, may formulate a response and trigger the response to be sent from the cortex, as shown at 816.

It should be noted that there may be numerous paths for processing various user inputs. For example, a user input may be processed via the NLU preprocessing and annotations 804. The NLU preprocessing and annotations 804 may identify that the user input is a first user input within a conversation, or the user input is a gesture made within an application. As such, the NLU preprocessing and annotations 804 may pass the user input to non-contextual predictions 808 and avoid contextual predictions 806. Contextual prediction 808 may also avoid conversation sentiment for non-contextual 814 and pass the non-contextual response to response from cortex 816.

In another example, a user input may be processed via the NLU preprocessing and annotations 804. The user input may initially be processed by non-contextual predictions 808. In the event that the system is confident, over a threshold level of confidence, that the non-contextual prediction is accurate, the contextual prediction may be avoided, and the user input may be passed from non-contextual predictions 808 to response from cortex 816.

In yet another example, a user input may be processed via the NLU preprocessing and annotations 804. The user input may initially be processed by non-contextual predictions 808. In the event that the system is not confident—i.e., determines below a threshold level of confidence—that the non-contextual prediction is accurate, contextual prediction 806 may be initiated. Initiation of contextual prediction 806 may be a direct initiation from the non-contextual prediction 808. Initiation of contextual prediction 806 may also be via the non-contextual prediction 808 communicating with cortex NLU preprocessing and annotations 804, which may, in turn, initiate contextual predictions 806. The user input may be passed from contextual predictions 806 to response from cortex 816 when the system is confident, over a threshold level of confidence, that the contextual prediction is accurate. The user input may be passed from non-contextual predictions 808 to response from cortex 816 when the system is confident, over a threshold level of confidence, that the classical prediction is accurate.

In still another example, when both the contextual prediction 806 and the non-contextual prediction 808 have been initiated, and the confidence levels of both the contextual prediction and the non-contextual prediction are lower than a threshold amount, and the confidence level of one prediction is not significantly higher than the confidence level of the other prediction, sentiment of the conversation may be considered. As such, a sentiment analysis score may be identified for the contextual prediction and for the non-contextual prediction, as shown at 810 and 814. Decider 812 may select the prediction with the higher sentiment analysis score. As such, the user input may be transferred from decider 812 to response from cortex 816.

Figure 9:
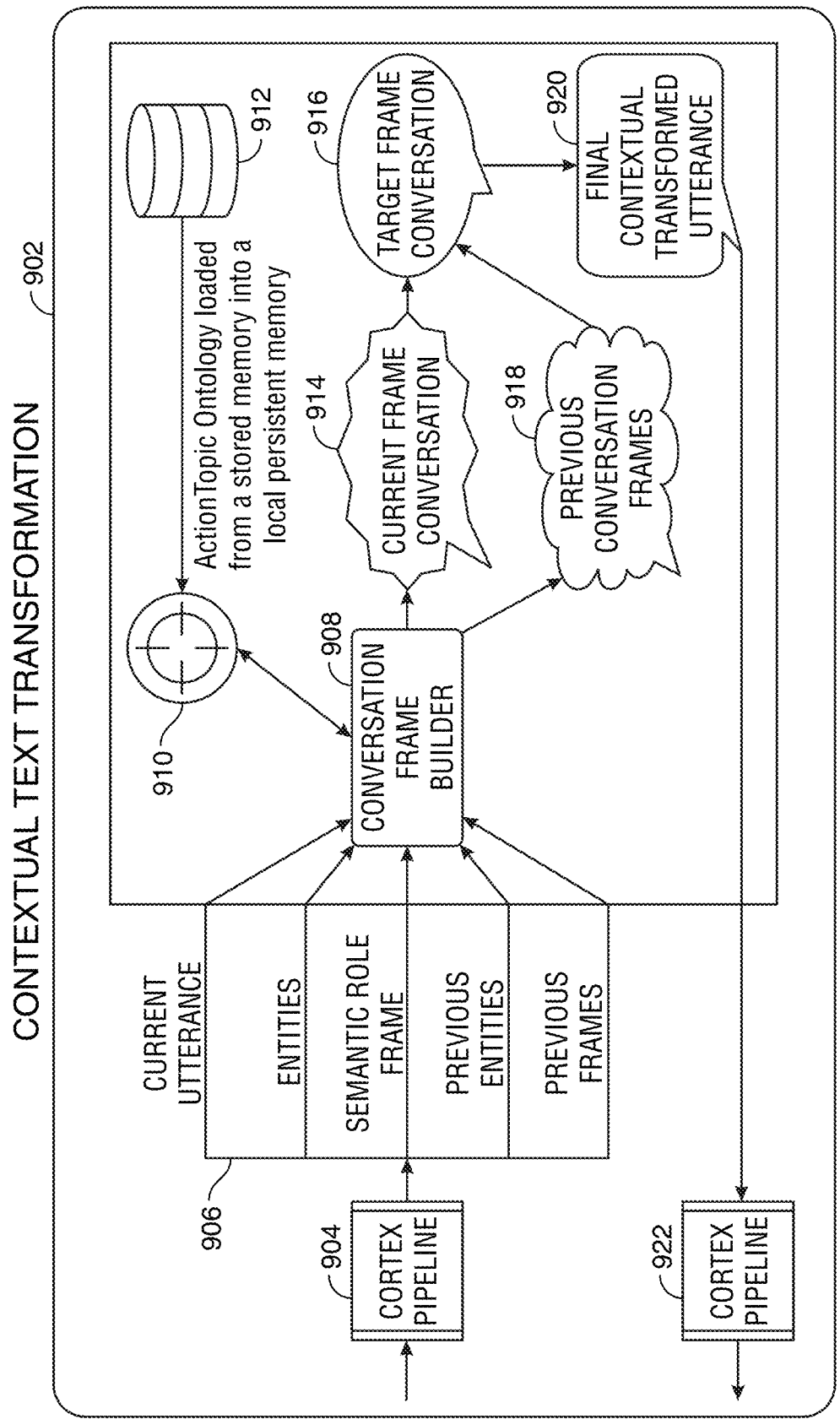
FIG. 9 shows a schematic illustration of selectively invoking a contextual text transformation in accordance with the principles of the disclosure.

FIG. 9 shows a schematic illustration of selectively invoking a contextual text transformation 902. Contextual text transformation 902 determines when to invoke context to determine intent, or to play a part in determining intent. Preferably, context may be invoked based on specific conditions. For example, in certain circumstances, context may be skipped if the user input comes in the form of a tap of a payment instrument. But in the case of an utterance, the intent prediction from the current utterance and its score may also be used to determine if contextual text transformation 902 should be attempted.

The cortex input pipeline is shown at 904. Pipeline 904 is preferably configured to receive inputs such as a current utterance 906 from a user or from another suitable source. Current utterance 906 may include for example entities, semantic role frames, previously identified entities, previous frames and/or other suitable information. It should be noted that, for the purposes of this application, frames refer to collections of words in a sentence or statement, collections of statements in a conversation, or any other suitable collection of constituents that may be used to determine an intent of a word or statement.

At 908, a selected number of previous utterances and related details are passed to the system at a conversation frame builder 908. Conversation frame builder 908 preferably initiates and assembles a framework for the conversation in which the utterances occur.

At 910, action/topic ontology (which draws from a stored memory into a local persistent memory, as shown at 912) may be used to build a conversation frame for the current utterance and to target a relevant action or topic for the utterance. Following such a build—the current conversation frame 914 may be merged with the information from previous conversation frames 918, to be included in the final target conversation frame 916. Final target conversation frame 916 provides a summary of the conversation at the current point.

At 920, the target conversation frame is validated and leveraged to form the final contextual transformed utterance. The validation preferably serves as a guardrail so that the system does not continue looping over older information even if current utterance does not have any relevant information. Then, based on heuristics, the validation helps generate the final contextual transformed utterance with additional signals, hence giving an enhanced utterance which can be used to understand the user input in the context of the conversation.

In conclusion, contextual text transformation 902 may be used to return a modified contextual utterance if found, as shown at 922.

As such, contextual text transformation 902 has been shown to use an existing model to predict intent and entities based at least in part on the enhanced contextual utterance.

Thus, systems and methods for a selection system for contextual prediction processing versus classical prediction processing are provided. Persons skilled in the art will appreciate that the present invention can be practiced by other than the described embodiments, which are presented for purposes of illustration rather than of limitation. The present invention is limited only by the claims that follow.

What is claimed is:

1. A three-tiered selection system for selecting either a contextual prediction processing or a classical prediction processing for providing a response to an electronic user input, the three-tiered selection system comprising:
   a receiver operating at an entity-specific interactive voice and text response system ("IVR"), said entity-specific IVR comprising at least one hardware processor and hardware memory, said receiver operable to receive the electronic user input from a software application operating on a hardware device associated with a user; and
   a selection processor, said selection processor comprising:
      a first tier, said first tier operable to:
         identify that the electronic user input is a first user input within a conversation and/or the electronic user input comprises a gesture entered by the user at the software application;
         initiate a classical analysis on the electronic user input, said classical analysis configured to:
            receive a plurality of identifying details relating to the user in addition to the electronic user input;
            electronically build, based on an action-topic ontology, said action-topic ontology being a language interpretable by the entity-specific IVR, said action-topic ontology including a plurality of entity-specific verbs, a plurality of entity-specific topics, a conversation frame corresponding to the electronic user input and the plurality of identifying details; and
            electronically communicate the conversation frame to a software code element within the entity-specific IVR, said software code element operable to generate a response to the electronic user input;
         identify, at the software code element, using the classical analysis, a classical response to the electronic user input; and
         electronically communicate the classical response as a text output and/or as an audio output to user via the software application;
      a second tier, said second tier operable to:
         initiate the classical analysis on the electronic user input;
         identify, using the classical analysis, the classical response to the electronic user input;
         identify a classical confidence value for the classical response to the electronic user input;
         identify that the classical confidence value is above a predetermined confidence value; and
         electronically communicate the classical response as a text output and/or as an audio output to the user via the software application; and
      a third tier, said third tier operable to:
         initiate a contextual analysis on the electronic user input when the classical confidence value is below the predetermined confidence value, said contextual analysis operable to transform the electronic user input into a contextual user input based on two or more user inputs included in the conversation, the contextual analysis configured to:
            receive one or more previous user inputs and a second plurality of details, said second plurality of details comprising identifying details relating to the user and data relating to the one or more previous user inputs, said data relating to the one or more previous user inputs comprising a position of each of the previous user inputs within the conversation;
            receive the conversation frame;
            merge the conversation frame with the second plurality of details to generate a target conversation frame, said target conversation frame structured to provide an answer to the user input;
            electronically communicate the target conversation frame to the software code element;
         identify, at the software code element, a contextual response to the contextual user input;
         identify a contextual confidence value for the contextual response to the contextual user input;
         compare the contextual confidence value to the classical confidence value;
         identify a sentiment analysis score for the contextual response and a sentiment analysis score for the classical response when the contextual confidence value is within a predetermined value window from the classical confidence value;
         compare the sentiment analysis score of the classical response to the sentiment analysis score of the contextual response;
         electronically communicate the contextual response as a text output and/or as an audio output to the user via the software application when the sentiment analysis score for the classical response is greater than the sentiment analysis score for the contextual response; and
         electronically communicate the classical response as a text output and/or as an audio output to the user via the software application when the sentiment analysis score for the contextual response is greater than the sentiment analysis score for the classical response.

2. The three-tiered selection system of claim 1, wherein the electronic user input comprises an utterance.

3. The three-tiered selection system of claim 1, wherein the gesture is entered by the user in response to a stimulus presented by the software application.

4. The three-tiered selection system of claim 1, wherein the gesture is a tap, click or selection.

5. The three-tiered selection system of claim 1, wherein the first tier is initiated upon receipt of the electronic user input at the receiver.

6. The three-tiered selection system of claim 1, wherein the second tier is initiated when the electronic user input is a subsequent user input within the conversation, or the electronic user input consists of a voice and/or text utterance.

7. The three-tiered selection system of claim 1, wherein the third tier is initiated when the second tier identifies that the classical confidence value is below the predetermined confidence value.

8. A three-tiered selection method for selecting either contextual prediction processing or classical prediction processing for providing a response to an electronic user input, the three-tiered selection method comprising:
   receiving, at an entity-specific interactive voice and text response system ("IVR"), the electronic user input from a software application operating on a hardware device associated with a user, said entity-specific IVR comprising at least one hardware processor and hardware memory;
   initiating, at a first tier, a classical analysis on the electronic user input when the electronic user input is a first electronic user input within a conversation and/or the electronic user input comprises a gesture entered by the user at the software application;
   identifying, at the first tier, using the classical analysis, a classical response to the electronic user input when the electronic user input is the first electronic user input within the conversation and/or the electronic user input comprises the gesture entered by the user at the software application, the identifying comprising:
      receiving a plurality of identifying details relating to the user in addition to the electronic user input;
      electronically building, based on an action-topic ontology, said action-topic ontology being a language interpretable by the entity-specific IVR, said action-topic ontology including a plurality of entity-specific verbs, a plurality of entity-specific topics, a conversation frame corresponding to the electronic user input and the plurality of identifying details; and
      electronically communicating the conversation frame to a software code element within the entity-specific IVR, said software code element operable to generate a response to the electronic user input;
   identifying, at the software code element, using the classical analysis, a classical response to the electronic user input; and
   electronically communicating the classical response as a text output and/or as an audio output to user via the software application;
   identifying, at the first tier, the classical response as an accurate response to the electronic user input when the electronic user input is the first electronic user input within the conversation and/or the electronic user input comprises the gesture entered by the user at the software application;
   initiating, at a second tier, the classical analysis on the electronic user input;
   identifying, at the second tier, using the classical analysis, the classical response to the electronic user input;
   identifying, at the second tier, a classical confidence value for the classical response to the electronic user input;
   identifying, at the second tier, the classical response as the accurate response to the electronic user input when the classical confidence value is above a predetermined confidence value;
   electronically communicating, from the second tier, the classical response as a text output and/or as an audio output to the user via the software application;
   initiating, at a third tier, a contextual analysis on the electronic user input when the classical confidence value is below the predetermined confidence value, said contextual analysis operable to transform the electronic user input into a contextual user input based on two or more user inputs included in the conversation, the contextual analysis including:
      receiving one or more previous user inputs and a second plurality of details, said second plurality of details comprising identifying details relating to the user and data relating to the one or more previous user inputs, said data relating to the one or more previous user inputs comprising a position of each of the previous user inputs within the conversation;
      receiving the conversation frame;
      merging the conversation frame with the second plurality of details to generate a target conversation frame, said target conversation frame structured to provide an answer to the user input;
      electronically communicating the target conversation frame to the software code element;
      identifying, at the software code element, a contextual response to the contextual user input;
      identifying, at the software code element, a contextual confidence value for the contextual response to the contextual user input; and
      comparing the contextual confidence value to the classical confidence value;
   identifying, at the third tier, the contextual response as the accurate response when the contextual confidence value is greater than the classical confidence value by over a threshold amount;
   identifying, at the third tier, the classical response as the accurate response when the classical confidence value is greater than the contextual confidence value by over the threshold amount;
   identifying, at the third tier, a sentiment analysis score for the contextual response and a sentiment analysis score for the classical response when the contextual confidence value is within a predetermined value window from the classical confidence value;
   comparing, at the third tier, the sentiment analysis score of the classical response to the sentiment analysis score of the contextual response;
   identifying, at the third tier, the contextual response as the accurate response when the sentiment analysis score for the classical response is greater than the sentiment analysis score for the contextual response;
   identifying, at the third tier, the classical response as the accurate response when the sentiment analysis score for the contextual response is greater than the sentiment analysis score for the classical response; and
   presenting the accurate response to the user via the software application.

9. The method of claim 8, wherein the electronic user input is a current utterance, and the contextual analysis comprises:
   receiving the conversation, said conversation comprising the current utterance, one or more previous utterances and a first plurality of details relating to the current utterance and a second plurality of details relating to the one or more previous utterances;
   using an action-topic ontology to build, with data retrieved from the current utterance and the first plurality of details, a current conversation frame corresponding to the current utterance;

merging the current conversation frame with data retrieved from the one or more previous utterances and/or the second plurality of details to generate a target conversation frame;

validating the target conversation frame to ensure that the contextual analysis is prevented from looping over historic data in an event that the current utterance fails to add relevant information;

based on a predetermined set of algorithms, generating an enhanced contextual utterance, said enhanced contextual utterance that can be used to understand the current utterance in a context of the conversation; and transmitting the enhanced contextual utterance to a module that generates the contextual response to the enhanced contextual utterance.

10. The method of claim 8, wherein the electronic user input is a current utterance, and the classical analysis comprises:

receiving the current utterance and a plurality of details relating to the current utterance;

using an action-topic ontology to build, with data retrieved from the current utterance and the plurality of details, a current conversation frame corresponding to the current utterance; and transmitting the current conversation frame to a module that generates a classical response to the current utterance.

11. The method of claim 8, wherein the electronic user input comprises an utterance.

12. The method of claim 8, wherein the gesture is entered by the user in response to a stimulus presented by the software application.

13. The method of claim 8, wherein the gesture is a tap, click or selection.

* * * * *